United States Patent
Brinkmeyer et al.

(10) Patent No.: US 7,603,585 B2
(45) Date of Patent: Oct. 13, 2009

(54) SYSTEMS AND METHODS FOR UPDATING FIELD REPLACEABLE UNITS

(75) Inventors: Jay C. Brinkmeyer, Colorado Springs, CO (US); Thomas D. Rhodes, The Woodlands, TX (US); Christoph L. Schmitz, Tomball, TX (US); Peter Hansen, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 330 days.

(21) Appl. No.: 11/697,717

(22) Filed: Apr. 7, 2007

(65) Prior Publication Data

US 2008/0250402 A1 Oct. 9, 2008

(51) Int. Cl.
*G06F 11/00* (2006.01)
(52) U.S. Cl. .......................................... 714/30
(58) Field of Classification Search ............. 714/2, 714/3, 5, 6, 15, 16, 20, 21, 37, 38, 45
See application file for complete search history.

(56) References Cited

U.S. PATENT DOCUMENTS

| | | | | |
|---|---|---|---|---|
| 5,293,556 | A * | 3/1994 | Hill et al. | 702/184 |
| 5,561,760 | A * | 10/1996 | Ferris et al. | 714/25 |
| 6,973,412 | B2 * | 12/2005 | King et al. | 702/182 |
| 7,168,007 | B2 * | 1/2007 | Gilstrap et al. | 714/37 |
| 2002/0124211 | A1 * | 9/2002 | Gray et al. | 714/39 |
| 2004/0088142 | A1 * | 5/2004 | Ashley et al. | 702/184 |
| 2004/0133819 | A1 * | 7/2004 | Krishnamurthy et al. | 713/300 |
| 2004/0162945 | A1 * | 8/2004 | King et al. | 711/122 |
| 2005/0005268 | A1 * | 1/2005 | Zilavy et al. | 717/170 |
| 2008/0133962 | A1 * | 6/2008 | Bofferding et al. | 714/4 |
| 2009/0049330 | A1 * | 2/2009 | Bavaria et al. | 714/3 |

* cited by examiner

*Primary Examiner*—Nadeem Iqbal

(57) ABSTRACT

Systems and methods for updating at least one field replaceable unit (FRU) are disclosed. In an exemplary embodiment the method may comprise generating a virtual image of a FRU ID for each FRU to be updated. The method may also comprise storing the virtual image separate from the FRU ID. The method may also comprise providing a handle to the virtual image so that updated information is retrieved from the virtual image when the FRU is accessed.

20 Claims, 4 Drawing Sheets

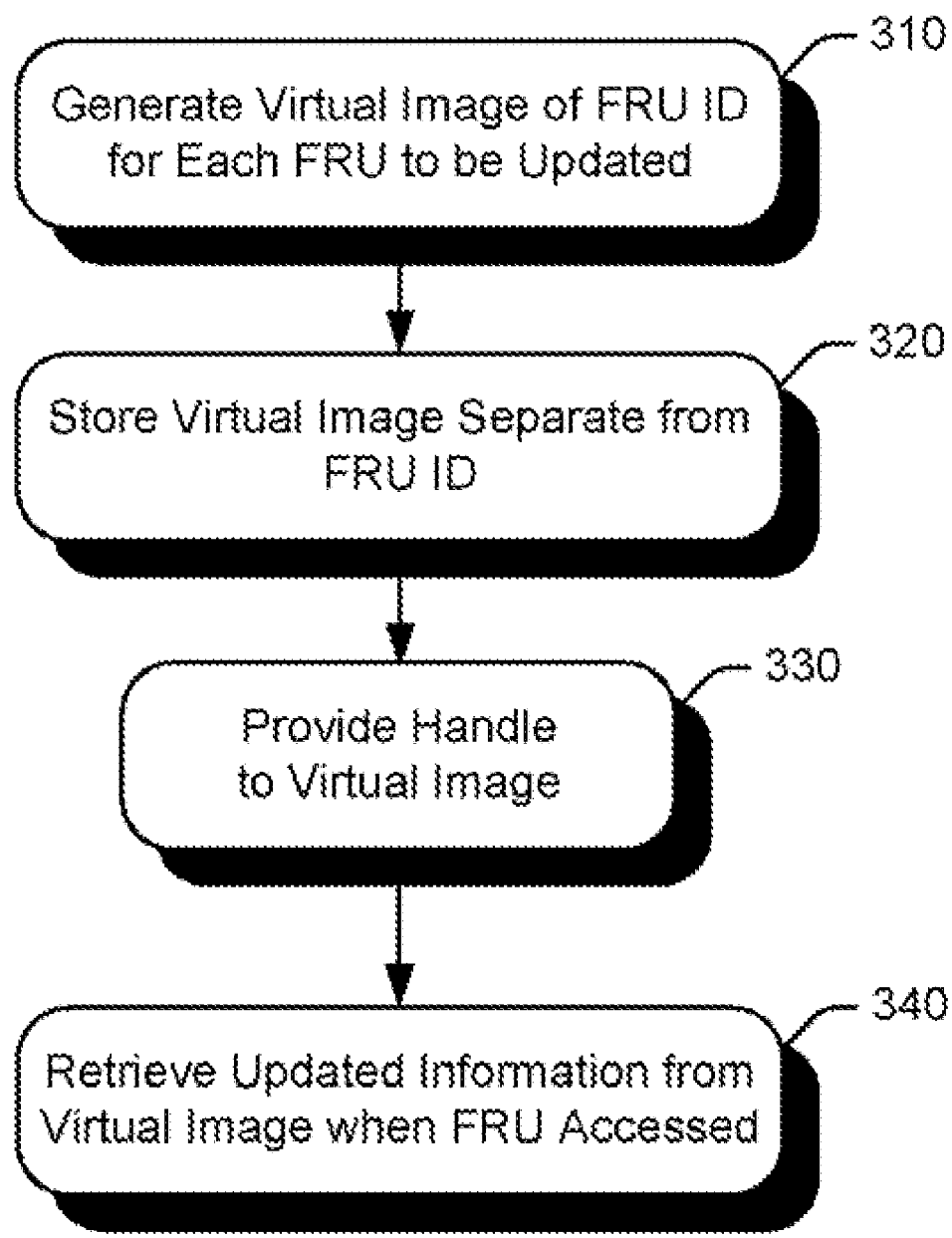

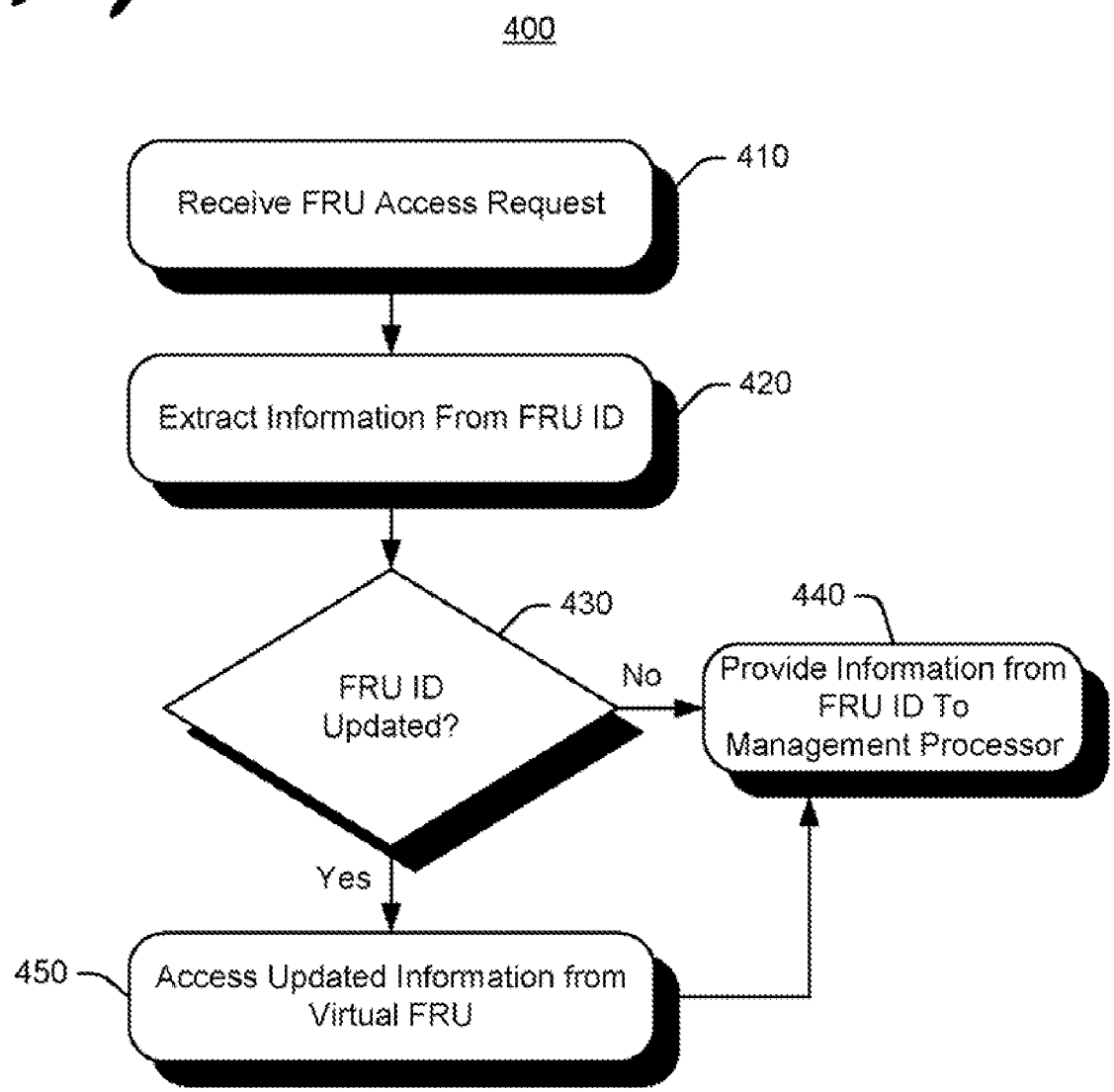

SYSTEMS AND METHODS FOR UPDATING FIELD REPLACEABLE UNITS

BACKGROUND

Manufacturers often include one or more components in computer systems or other electronic equipment that are referred to as Field Replaceable Units (or "FRU"). As the name implies, the FRU can be readily removed from the computer system or other electronic equipment and replaced by the user (e.g., a technician) without having to send the entire system back to the manufacturer for repairs. Examples of FRUs include, but are not limited to, circuit boards, processors(s), memory modules, storage devices, power supplies, and even peripheral devices.

In order to identify the FRU, information is typically stored in nonvolatile memory (e.g., electronically erasable programmable read-only memory or "EEPROM") associated with the FRU and referred to as a Field Replaceable Unit Identification Device (or "FRU ID"). The FRU ID may be accessed by a management process for the computer system or other electronic device during operation (e.g., at start-up) so that the management process can control the FRU (e.g., power-on/off).

Information stored in the FRU ID is not always accurate or up to date, and therefore may need to be replaced. For example, the FRU may be shipped with incomplete or incorrect information. Or for example, the FRU may be updated to provide extended functionality, and accordingly the FRU ID may also need to be updated to reflect changes to the FRU. Updating the FRU ID, however, can be risky. If the FRU is suddenly power-cycled or power is otherwise removed during the update procedure, the FRU ID may become corrupt, possibly irreversibly corrupt, thereby rendering the FRU useless.

BRIEF DESCRIPTION OF THE DRAWINGS

FIG. 3 is a flowchart illustrating exemplary operations for updating Field Replaceable Units (FRU).

FIG. 4 is a flowchart illustrating exemplary operations for accessing updated information for Field Replaceable Units (FRU).

DETAILED DESCRIPTION

Briefly, systems and methods may be implemented for updating field replaceable units (FRU). Exemplary systems and methods implement a virtual Field Replaceable Unit Identification Device (virtual FRU ID) that enables information for the FRU to be updated and/or altogether replaced. The virtual FRU ID may include computer readable storage that is provided separate from the FRU ID, and therefore can be safely updated even if the device power-cycles or power is otherwise removed during an update procedure. Program code may also be provided for accessing information from the virtual FRU ID so that access is transparent to the management processor.

Exemplary System

Figure 1:
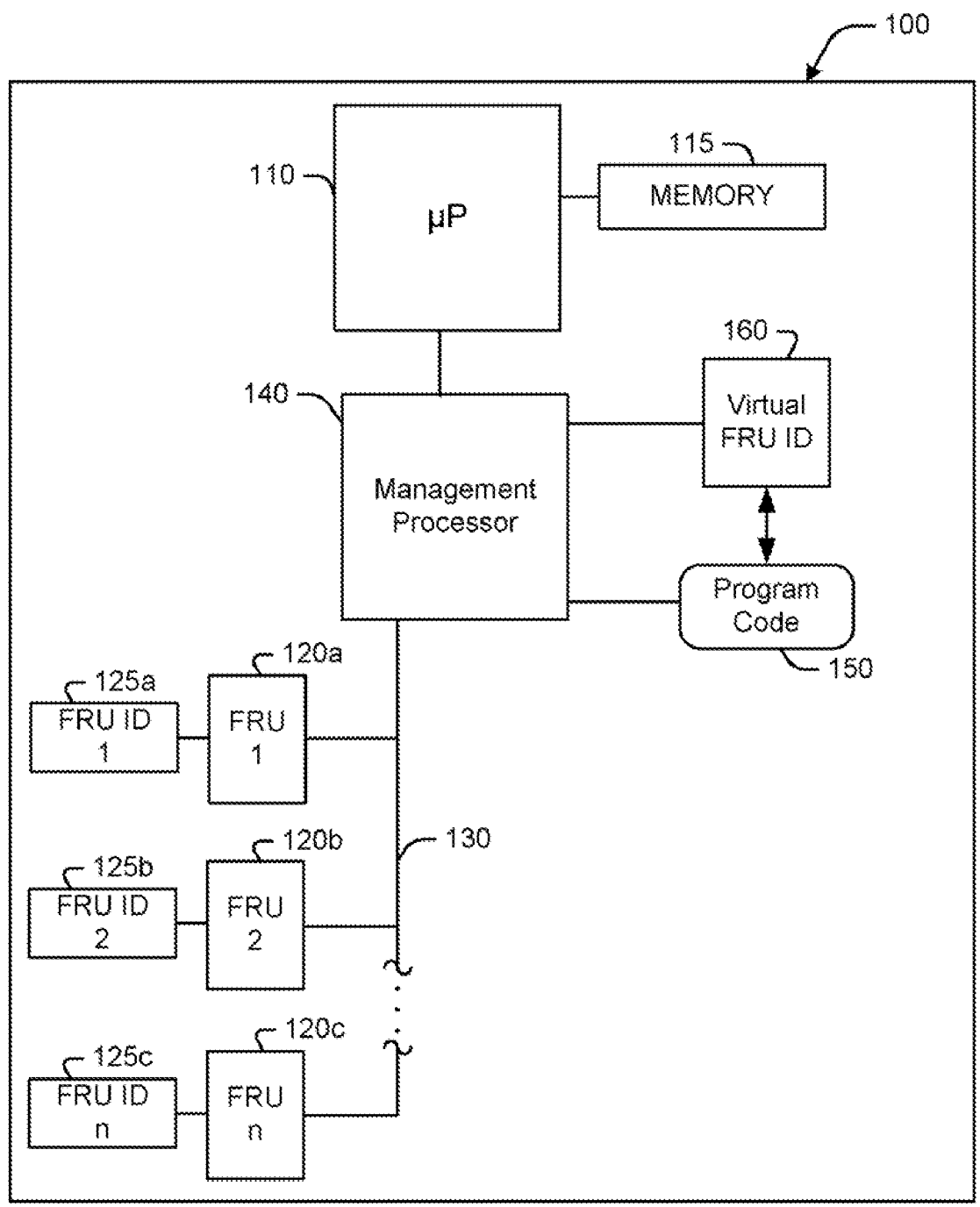
FIG. 1 is a schematic illustration of an exemplary computer system which may be implemented for updating Field Replaceable Units (FRU).

FIG. 1 is a schematic illustration of an exemplary computer system 100 which may be implemented for updating Field Replaceable Units (FRU). In an exemplary embodiment, the computer system 100 may be a blade server, although the systems and methods described herein are not limited to such a configuration and may include other computers, such as, e.g., server, laptop and/or desktop computers.

Exemplary computer system 100 may include one or more processors or processing units 110 and a system memory 115. System memory 115 may include, e.g., read only memory (ROM) and random access memory (RAM). For example, a basic input/output system (BIOS), containing the basic routines that help to transfer information, such as during start-up, its typically stored in ROM.

Computer system 100 may also include one or more FRU 120a-c, such as, but not limited to, a hard disk drive or other computer-readable storage, and I/O devices (e.g., a keyboard, mouse, and display), to name only a few examples. Still other FRU may also be provided for the computer system 100, as is readily apparent to one having ordinary skill in the art. The FRU may be connected by appropriate interfaces (either externally or internally) to the computer system 100.

A local bus 130 (or other connection) couples the FRU 120a-c to the processor 110 via a management processor 140. The bus represents one or more of any of several types of structures, and may be implemented using any of a variety of communication architectures.

Management processor 140 may be provided to handle logical connections and communications between the processing units 110 and FRU 120a-c. The connection may be enabled by hardware and/or software/firmware provided in the management processor 140 (e.g., the management processor 140 is provided with these capabilities). In an exemplary embodiment, management processor 140 executes program code (e.g., firmware) to make the FRU 120a-c available to other computers, devices and/or processes (generally referred to as clients).

In an exemplary embodiment, management processor 140 may be implemented, e.g., using the Integrated Lights-Out (iLO) intelligent management processor integrated on most ProLiant® server computers commercially available from Hewlett-Packard Company (Palo Alto, Calif., USA). The iLO management processor provides a virtual presence (i.e., complete control regardless of the server status or location). The iLO management processor is currently available as iLO Standard and iLO Advanced. The iLO Standard management processor provides basic system board management functions and diagnostics. The iLO Advanced management processor provides these features plus support for remote administration. It is noted, however, that the management processor 140 is not limited to use with the iLO management processor, and other management processors now available or later developed may also be implemented.

During operation, the management processor 140 may retrieve information for the FRU 120a-c from the corresponding FRU ID 125a-c. This information may be used by the processing units 110 to control the FRU 120a-c. For example, controlling the FRU 120a-c may including instructions to power-on/off the FRU. Numerous other functions may also be enabled for the FRU based on information in the FRU ID 125a-c.

In an exemplary embodiment, the FRU ID 125a-c includes information stored in EEPROM. Exemplary information which may be stored in the FRU ID 125a-c is shown below for purposes of illustration:

| Base FRU EEPROM (Device ID 00h) | | |
|---|---|---|
| Address | Data | Description |
| 00h | 01h | Common Header |
| 01h | 00h | Internal Use Area |
| 02h | 01h | Chassis Info Area, EEPROM Offset 08h |
| 03h | 06h | Board Info Area, EEPROM Offset 30h |
| 04h | 10h | Product Info Area, EEPROM Offset 80h |
| 05h | 18h | Multi-Record Info Area, EEPROM Offset C0h |
| 06h | 00h | Pad |
| 07h | D0h | Zero checksum |
| 08h | 01h | Chassis Area Info Version |
| 09h | 05h | Chassis Info Area Length: 28h (05h * 8h) |
| 0Ah | 16h | Chassis Type: RAID Chassis |
| 0Bh | 00h | Chassis Part Number Type/Length = 0 (NOT USED) |
| 0Ch | CAh | Chassis Serial Number Type/Len: 10 characters ASCII |
| 0Dh | 30h | Chassis Serial Number '0000000000' |
| 17h | 09h | Custom Field Type/Length: 9 byte binary |
| ... | | |
| 30h | 01h | Board Info Area Format version |
| 31h | 0Ah | Board info Area Length |
| ... | | |
| 80h | 01h | Product Info Area Format version |
| 81h | 08h | Product info Area Length |
| ... | | |
| C0h | D0h | Multi-Record Area (Record Type ID) |
| C1h | 02h | End of List and format version |
| ... | | |
| F4h | D0h | Multi-Record Area (Record Type ID) |
| F5h | 02h | End of List and format version |
| F6h | 08h | Record Length |
| ... | | |
| 101h | D0h | Multi-Record Area: Manufactured-For Product Specific Record |
| 102h | 82h | Internal Use Format Version |
| 103h | 07h | Record length |
| 104h | E8h | Record Checksum (zero checksum) area from 106h-10Ch |
| ... | | |

This information may be converted to a binary image that gets downloaded to the physical memory device (e.g. memory 115) and used by the processing units 110. Some fields in the FRU ID are written at during the manufacture process (e.g., original serial numbers) and never change. Other fields are configurable by the end-user. For example, end-users may be able to change the Chassis Area serial number (SN) for cases where one blade dies and another is swapped in as a replacement.

Changing the Chassis Area serial number is considered to be a "low risk" write to the FRU ID. However, updating the significant portions (or even the entire) information in the FRU ID poses substantial risk to data integrity. Accordingly, program code 150 may be provided to update the information in the FRU ID using virtual FRU ID 160.

The program code 150 (e.g., firmware) may be stored on various types of computer-readable media (e.g., ROM, RAM, flash memory, etc.) operatively associated with the management processor 140. During operation, the program code 150, including computer-readable instructions, data structures, program modules and/or other data, may be accessed by the management processor 140 for execution. Exemplary implementations of program code for updating the FRU 120a-c are described in more detail below with reference to FIG. 2.

Before continuing, however, it is noted that exemplary computer system 100 shown in FIG. 1 and described above is provided for purposes of illustration and is not intended to be limiting. The systems and methods described herein are not limited to use with any particular type or configuration of computer system. Indeed, updating the FRU may also be implemented for other types of electronic devices (e.g., consumer televisions). It is also noted that the systems and methods described herein are not limited to use with any particular type or configuration of FRU.

Figure 2:
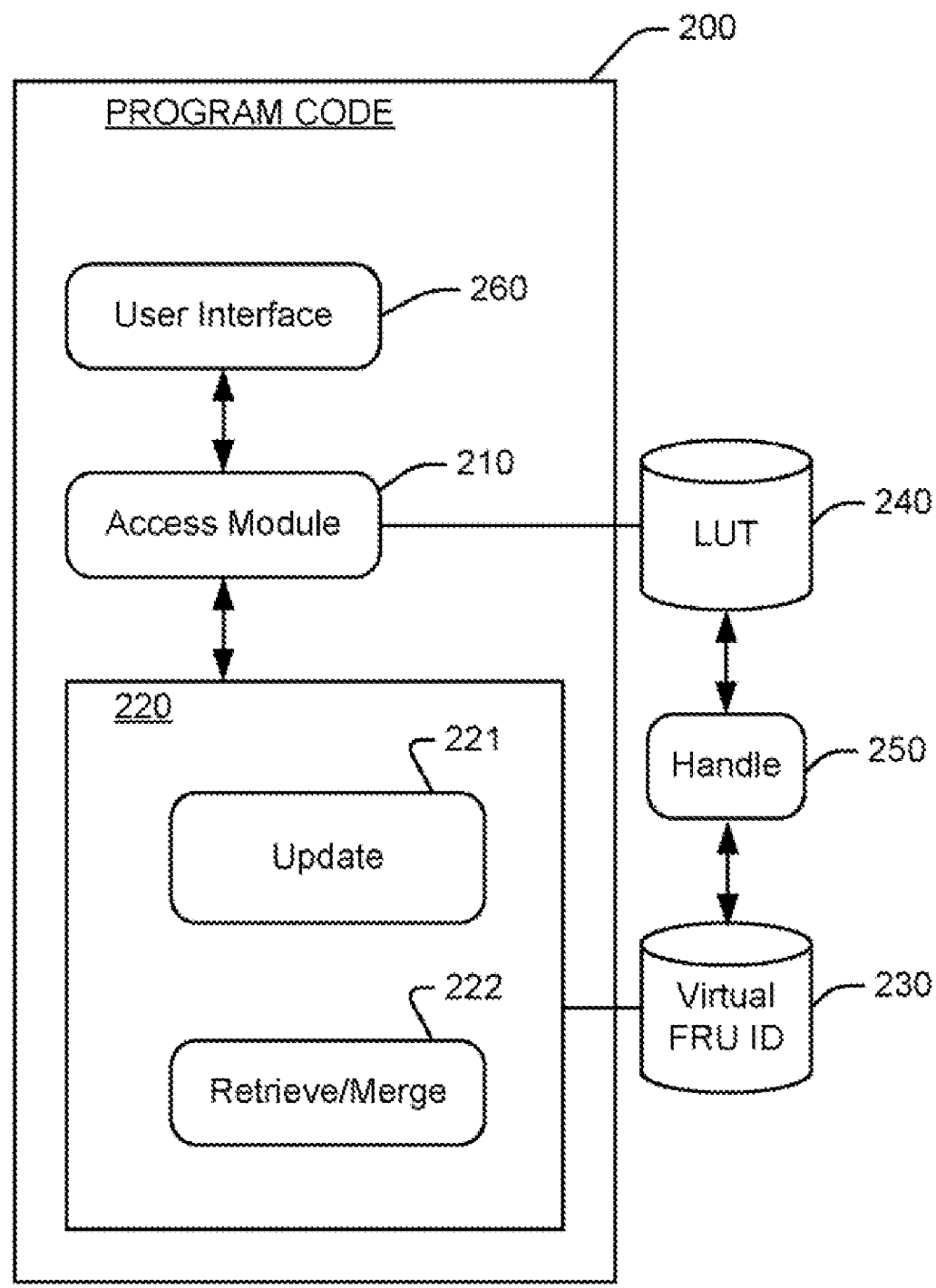
FIG. 2 is a functional block diagram of exemplary program code for updating Field Replaceable Units (FRU).

FIG. 2 is a functional block diagram of exemplary program code 200 (e.g., firmware) for updating Field Replaceable Units (FRU). Exemplary program code 200 includes computer-readable instructions that may be stored in memory and executed by a management processor (e.g., the management processor 140 in FIG. 1) to implement the functions described herein.

Program code 200 may include various functional modules, such as, access module 210 for interfacing with the processing modules (e.g., processor 110 in FIG. 1). Access module 210 includes instructions for processing requests to access the FRU so that the management processor can provide information for the FRU to client(s) making the request. In an exemplary embodiment, the access module 210 also instructs the management controller to physically connect the client to the FRU.

In an exemplary embodiment, access module 210 may be operatively associated with a network queue for managing multiple access requests to the FRU. Access module 210 may also be operatively associated with a device queue for managing the FRU (e.g., FRU availability). In an exemplary embodiment, network queue and device queue may be implemented as one or more data structure. The use of queues for managing devices and traffic is well-known in the art and further description is not necessary.

Program code 200 may also include modules 220 for managing the virtual FRU ID 230. In an exemplary embodiment, modules 220 include update module 221 and retrieve/merge module 222. Update module 221 may be implemented to generate a virtual image of information in the FRU ID to be updated and write updated information to the virtual image. Update module 221 may also make entries to a look-up-table (LUT) 240 and enable a handle 250 that interfaces between the LUT 240 and virtual FRU ID 230 so that updated information can be retrieved from the virtual FRU ID 230 when the FRU is accessed.

Retrieve/merge module 222 may be implemented to retrieve updated information from the virtual FRU ID 230 when the FRU is accessed. The retrieve/merge module 222 serves as an abstraction layer to provide updated information for the FRU to the client requesting access to the FRU.

During operation, the various functional modules of program code 200 may execute to update information for FRU. In an exemplary embodiment, the update module 221 invokes a device-specific handler that selectively fixes broken fields, re-computes checksums (if necessary), and marks the virtual FRU ID for the FRU as "good." The retrieve/merge module 222 then serves as an abstraction layer, providing all information for the FRU from the virtual FRU ID (e.g., the "doctored" FRU image) to client(s) subsequently requesting information from the FRU ID.

In another exemplary embodiment, the update module 221 only writes selected fields from the FRU ID to the virtual FRU ID. The retrieve/merge module 222 then serves as an abstraction layer, combining the replaced or updated information from the virtual FRU ID with original information in the FRU ID, and then providing the merged information to client(s) subsequently requesting information from the FRU ID.

In either embodiment, no writes are actually done to the physical FRU ID. Accordingly, the update process is safe from device power-cycles and removal. The update process is non-disruptive, and no operator intervention is required (e.g., the cut/paste fields from an old FRU image into the updated FRU image).

Optionally, program code 200 may include a user interface (UI) module 260. UI module 260 may be implemented to interact with a user in a graphical user interface operating environment. UI module 260 may receive input and deliver output via ancillary hardware (e.g., keyboard, monitor, printer, scanner), and/or interact with other functional modules to enable a user to update the FRU. For example, the UI module 260 may enable a user to select which information in the FRU ID need updating, add/delete fields in the virtual FRU, among other functions.

Although exemplary program code is described with reference to FIG. 2 as including various functional modules, it is noted that the program code is shown and described herein merely for purposes of illustration and is not limited to any particular implementation. For example, the modules described above do not need to be encapsulated as separate functional components. In addition, other functional components may also be provided and are not limited to those shown and described herein.

Before continuing, it is noted that the exemplary embodiments discussed above are provided for purposes of illustration. Still other embodiments are also contemplated.

Exemplary Operations

FIGS. 3 and 4 are flowcharts illustrating exemplary operations which may be implemented for updating Field Replaceable Units (FRU). The operations may be embodied as logic instructions (e.g., firmware or other program code) on one or more computer-readable medium. When executed, the logic instructions implement the described operations. In an exemplary embodiment, the components and connections depicted in the figures may be used.

FIG. 3 is a flowchart illustrating exemplary operations 300 for updating FRU. In operation 310, a virtual image of a FRU ID (or a "virtual FRU ID") is generated for each FRU to be updated. The virtual image may be a copy of information in the FRU ID, a partial copy of information in the FRU ID, or entirely new information from that contained in the FRU ID. The virtual image enables information to be updated for the FRU without writing to the FRU ID. Accordingly, information in the FRU ID can be updated without risking loss to information in the FRU ID for the FRU if power is removed during an update process. That is, the FRU and the FRU ID are immune to power removal during updating.

In operation 320, the virtual image is stored separate from the physical FRU ID. In operation 330, a handle is provided to the virtual image so that updated information is retrieved from the virtual image when the FRU is accessed.

FIG. 4 is a flowchart illustrating exemplary operations 400 for accessing updated information for FRU. In operation 410, a FRU access request is received. For example, the management processor may receive a request to power-on a FRU from the central processor. In operation 420, information is extracted from the physical FRU ID corresponding to the FRU access request.

In operation 430, a determination is made whether information in the FRU ID has been updated. If the information in the FRU ID has not been updated, the information extracted from the FRU ID may be provided to the management processor in operation 440. If the information in the FRU ID has been updated, the updated information may be accessed from the virtual FRU ID in operation 450. The updated information may then be provided to the management processor in operation 440.

The operations shown and described herein are provided to illustrate exemplary embodiments for updating FRU. It is noted that the operations are not limited to the ordering shown. In addition, not all of the operations need to be implemented. Still other operations may also be implemented.

In addition to the specific embodiments explicitly set forth herein, other aspects and embodiments will be apparent to those skilled in the art from consideration of the specification disclosed herein. It is intended that the specification and illustrated embodiments be considered as examples only.

The invention claimed is:

1. A system comprising:
   a virtual image of a FRU ID stored on computer readable storage provided separately from the FRU ID, the virtual image including updated information for a field replaceable unit (FRU); and
   a handle to the virtual image, the handle relating access requests for information in the FRU ID to the updated information in the virtual image.

2. The system of claim 1 wherein information for the FRU is updated without changing information in the FRU ID for the FRU.

3. The system of claim 1 wherein information for the FRU is updated without risking loss to information in the FRU ID for the FRU if power is removed during an update process.

4. The system of claim 1 wherein the broken fields in the FRU ID are repaired in the virtual FRU ID.

5. The system of claim 1 wherein the information in the FRU ID is replaced with updated information in the virtual FRU ID.

6. The system of claim 1 wherein information in the virtual image is provided to a client accessing the FRU instead of information in the FRU ID.

7. The system of claim 1 wherein information in the virtual image is provided to a client accessing the FRU along with information in the FRU ID.

8. A method for updating at least one field replaceable unit (FRU), comprising:
   generating a virtual image of a FRU ID for each FRU to be updated;
   storing the virtual image separate from the FRU ID; and
   providing a handle to the virtual image so that updated information is retrieved form the virtual image when the FRU is accessed.

9. The method of claim 3 wherein the FRU is updated without writing the updated information to the FRU ID.

10. The method of claim 3 wherein updating the FRU is immune to power removal during updating.

11. The method of claim 3 further comprising selectively fixing broken fields in the FRU ID using the virtual FRU ID.

12. The method of claim 3 further comprising returning only updated information from the virtual image when the FRU is accessed.

13. The method of claim 3 wherein retrieving the updated information from the virtual image is transparent to a client accessing the FRU.

14. The method of claim 3 further comprising merging the updated information from a virtual image with information from the FRU ID.

15. The method of claim 6 wherein merging the updated information from the virtual image with information from the FRU ID is transparent to a client accessing the FRU.

16. The method of claim 6 further comprising returning the merged information when the FRU is accessed.

17. A system for updating at least one field replaceable unit (FRU), comprising:

means for storing updated information for the at least one FRU without changing information in a FRU ID for the FRU; and means for retrieving the updated information when the FRU is accessed.

18. The system of claim 17 further comprising means for returning both the updated information and at least some of the information in the FRU ID when the FRU is accessed.

19. The system of claim 17 wherein the means for retrieving the updated information is transparent to a client accessing the FRU.

20. The system of claim 17 wherein updating the at least one FRU is immune to power loss during updating.

* * * * *

UNITED STATES PATENT AND TRADEMARK OFFICE
CERTIFICATE OF CORRECTION

| | |
|---|---|
| PATENT NO. | : 7,603,585 B2 |
| APPLICATION NO. | : 11/697717 |
| DATED | : October 13, 2009 |
| INVENTOR(S) | : Jay C. Brinkmeyer et al. |

It is certified that error appears in the above-identified patent and that said Letters Patent is hereby corrected as shown below:

In column 1, line 21, delete "process" and insert -- processor --, therefor.

In column 1, line 23, delete "process" and insert -- processor --, therefor.

In column 6, line 43, in Claim 8, delete "form" and insert -- from --, therefor.

Signed and Sealed this

Sixth Day of April, 2010

David J. Kappos
*Director of the United States Patent and Trademark Office*